US006359024B2

(12) United States Patent
Lai

(10) Patent No.: US 6,359,024 B2
(45) Date of Patent: *Mar. 19, 2002

(54) METHOD FOR POLYMERIZING CONTACT LENSES

(75) Inventor: Yu-Chin Lai, Pittsford, NY (US)

(73) Assignee: Bausch & Lomb Incorporated, Rocheser, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,701

(22) Filed: May 15, 1998

(51) Int. Cl.⁷ ............................ C08F 2/46; C08G 77/04; C08J 3/28; C08K 3/20; C08L 83/04

(52) U.S. Cl. ................ 522/64; 264/1.36; 264/299; 351/160 R; 522/38; 522/36; 522/68; 523/106; 523/107; 525/937; 526/193; 526/279

(58) Field of Search ................ 523/106, 107; 522/38, 36, 68, 64; 525/937; 526/193, 279; 264/1.36, 299; 351/160 R

(56) References Cited

U.S. PATENT DOCUMENTS

| | | |
|---|---|---|
| 3,159,646 A | 12/1964 | Milionis et al. |
| 3,408,429 A | 10/1968 | Wichterle ............... 264/1 |
| 3,660,545 A | 5/1972 | Wichterle ............... 264/1 |
| 3,761,272 A | 9/1973 | Mannens et al. ............. 96/84 |
| 4,113,224 A | 9/1978 | Clark et al. ................ 249/105 |
| 4,197,266 A | 4/1980 | Clark et al. .................. 264/1 |
| 4,304,895 A | 12/1981 | Loshaek ..................... 526/313 |
| 4,528,311 A | 7/1985 | Beard et al. ................. 524/91 |
| 4,716,234 A | 12/1987 | Dunks et al. ............... 548/259 |
| 4,719,248 A | 1/1988 | Bambury et al. ........... 523/108 |
| 4,997,897 A | 3/1991 | Melpolder ................... 526/284 |
| 5,034,461 A | 7/1991 | Lai et al. .................... 525/100 |
| 5,271,875 A | 12/1993 | Appleton et al. ............ 264/2.3 |
| 5,420,324 A | 5/1995 | Lai et al. .................... 556/419 |
| 5,496,871 A | 3/1996 | Lai et al. .................... 523/107 |
| 5,610,252 A | 3/1997 | Bambury et al. ............ 526/279 |
| 5,623,002 A * | 4/1997 | Nomura et al. ............. 523/106 |
| 5,708,049 A * | 1/1998 | Katagiri et al. ............. 523/106 |

OTHER PUBLICATIONS

Product literature for Irgacure–819 and Irgacure–1800, Ciba Specialty Chemicals.

* cited by examiner

*Primary Examiner*—Patrick D. Niland
(74) *Attorney, Agent, or Firm*—John E. Thomas

(57) ABSTRACT

A method for photopolymerizing a monomer mixture to form a lens involves charging to a mold a monomer mixture including lens-forming monomers, and exposing the monomer mixture in the mold to a light source including light in the visible region of the spectrum. The method is useful for monomer mixtures that include a UV-absorbing compound and/or a tinting agent. Preferably, the monomer mixtures include a polymerization initiator including a phosphine oxide moiety.

8 Claims, No Drawings

METHOD FOR POLYMERIZING CONTACT LENSES

BACKGROUND OF THE INVENTION

The present invention relates to a method for photopolymerizing a monomer mixture to form a lens, wherein the monomer mixture may include a UV-absorbing compound and a tint and is exposed to a light source including light in the visible region of the spectrum.

Lenses such as contact lenses or intraocular lenses may include a UV absorbing agent in the lens to absorb light in the ultraviolet region of the spectrum, more particularly, to absorb light in the region of about 200 to 400 nm and, especially, about 290 to 400 nm. Representative UV absorbing materials for such lens applications are described in U.S. Pat. No. 4,304,895 (Loshaek), U.S. Pat. No. 4,528,311 (Beard et al.) and U.S. Pat. No. 4,719,248 (Bambury et al.).

Such lenses may also include a tint. The tint may be relatively rich in hue, so as to change or at least enhance the color of the iris when the lens is placed thereon. Alternately, the tint may be relatively light in hue, so that it does not change or enhance the color of the iris but does facilitate handling of the lens by a user; a representative "visibility tint" for contact lenses is described in U.S. Pat. No. 4,997,897 (Melpolder).

Generally, such lenses are formed by free radical polymerization of a monomer mixture including desired lens-forming monomers, usually in the presence of heat (thermal polymerization) or a light source (photopolymerization). One particular method for producing contact lenses involves thermal polymerization of the initial monomeric mixture in tubes in a heated water bath to provide rod-shaped articles, which rods are then cut into buttons, the buttons then being lathed into contact lenses; such methods for forming lenses including a UV absorbing agent are illustrated in the aforementioned U.S. Pat. No. 4,304,895 (Loshaek) and U.S. Pat. No. 4,528,311 (Beard et al.). Other methods involve casting the lenses directly in molds, wherein the monomer mixture is charged to the mold and polymerized by exposure to ultraviolet radiation.

Among photopolymerization processes, UV curing (i.e., exposure of the monomer mixture to radiation mainly in the ultraviolet region) of the monomer mixtures has proved very effective. However, for lenses including a UV absorbing agent, problems are encountered when attempting to cure the monomer mixtures since this agent absorbs UV light, thus diminishing the amount of UV light available to effect polymerization and resulting in ineffective or uneven curing of the monomer mixture.

It is also possible to effect photopolymerization using a light source also including light in the visible region of the spectrum, although light in this region is generally less efficient in effecting polymerization of conventional lens-forming monomer mixtures than UV curing. U.S. Pat. 4,719,248 (Bambury) reports successful polymerization of contact lens compositions including a UV absorbing agent by exposure of the monomer mixture to visible light. However, it has been found that the methods illustrated in the Bambury patent could not effectively polymerize monomer mixtures for contact lenses that included, in addition to the UV absorbing agent, a tinting agent.

Accordingly, it would be desirable to provide a method whereby lenses including both a UV absorbing agent and a tinting agent can be effectively photopolymerized by free radical polymerization. The present invention provides such a method and solves the aforementioned problems.

SUMMARY OF THE INVENTION

The invention provides a method for photopolymerizing a monomer mixture to form a lens comprising charging to a mold a monomer mixture including lens-forming monomers, and exposing the monomer mixture in the mold to a light source including light in the visible region of the spectrum. The method is useful for monomer mixtures that include a UV-absorbing compound and a tinting agent. Preferably, the monomer mixtures include a polymerization initiator including a phosphine oxide moiety.

DETAILED DESCRIPTION OF PREFERRED EMBODIMENTS

The monomer mixtures employed in the invention include conventional lens-forming monomers, UV absorbing agents and tinting agents.

The lens-forming monomers are monomers that are polymerizable by free radical polymerization, generally including an activated unsaturated radical, and most preferably an ethylenically unsaturated radical. (As used herein, the term "monomer" denotes relatively low molecular weight compounds that are polymerizable by free radical polymerization, as well as higher molecular weight compounds also referred to as "prepolymers", "macromonomers", and related terms.)

An especially preferred class of lens-forming monomers are those that form hydrogel copolymers. A hydrogel is a crosslinked polymeric system that can absorb and retain water in an equilibrium state. Accordingly, for hydrogels, the monomer mixture will typically include a hydrophilic monomer. Suitable hydrophilic monomers include: unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; and acrylamides, such as methacrylamide and N,N-dimethylacrylamide.

Another preferred class of lens-forming monomers are those that form silicone hydrogel copolymers. Such systems include, in addition to a hydrophilic monomer, a silicone-containing monomer. One suitable class of silicone containing monomers include known bulky, monofunctional polysiloxanylalkyl monomers represented by Formula (I):

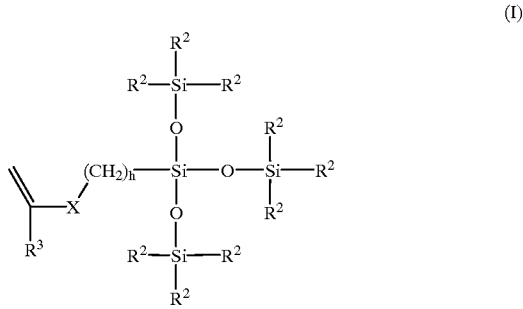

wherein:

X denotes —COO—, —CONR$^4$—, —OCOO—, or —OCONR$^4$— where each where R$^4$ is H or lower alkyl; R$^3$ denotes hydrogen or methyl; h is 1 to 10; and each R$^2$ independently denotes a lower alkyl or halogenated alkyl radical, a phenyl radical or a radical of the formula —Si(R$^5$)$_3$ wherein each R$^5$ is independently a lower alkyl radical or a phenyl radical. Such bulky monomers specifically include methacryloxypropyl tris(trimethylsiloxy)silane, pentamethyldisiloxanyl methylmethacrylate, tris(trimethylsiloxy)methacryloxy propylsilane, methyldi(trimethylsiloxy)methacryloxymethyl silane, 3-[tris(trimethylsiloxy)silyl] propyl vinyl carbamate, and 3-[tris(trimethylsiloxy)silyl] propyl vinyl carbonate.

Another suitable class are multifunctional ethylenically "end-capped" siloxane-containing monomers, especially difunctional monomers represented Formula (II):

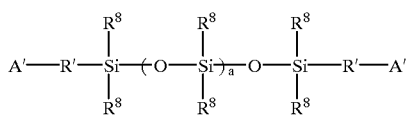

wherein:
- each A' is independently an activated unsaturated group;
- each R' is independently are an alkylene group having 1 to 10 carbon atoms wherein the carbon atoms may include ether, urethane or ureido linkages therebetween;
- each $R^8$ is independently selected from monovalent hydrocarbon radicals or halogen substituted monovalent hydrocarbon radicals having 1 to 18 carbon atoms which may include ether linkages therebetween, and
- a is an integer equal to or greater than 1. Preferably, each $R^8$ is independently selected from alkyl groups, phenyl groups and fluoro-substituted alkyl groups. It is further noted that at least one $R^8$ may be a fluoro-substituted alkyl group such as that represented by the formula:

—D'—(CF$_2$)$_s$—M' wherein:

D' is an alkylene group having 1 to 10 carbon atoms wherein said carbon atoms may include ether linkages therebetween;

M' is hydrogen, fluorine, or alkyl group but preferably hydrogen; and s is an integer from 1 to 20, preferably 1 to 6.

With respect to A', the term "activated" is used to describe unsaturated groups which include at least one substituent which facilitates free radical polymerization, preferably an ethylenically unsaturated radical. Although a wide variety of such groups may be used, preferably, A' is an ester or amide of (meth)acrylic acid represented by the general formula:

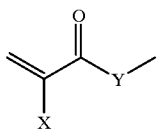

wherein X is preferably hydrogen or methyl, and Y is —O— or —NH—. Examples of other suitable activated unsaturated groups include vinyl carbonates, vinyl carbamates, fumarates, fumaramides, maleates, acrylonitryl, vinyl ether and styryl. Specific examples of monomers of Formula (II) include the following:

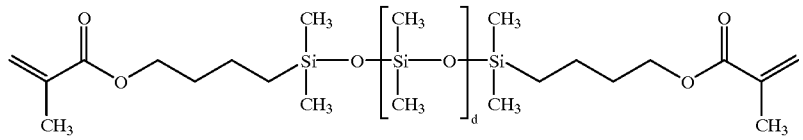
(IIa)

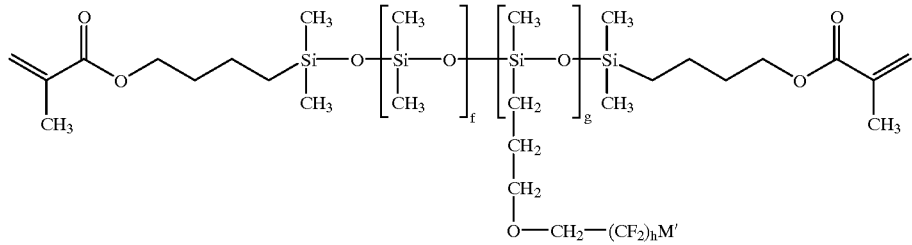
(IIb)

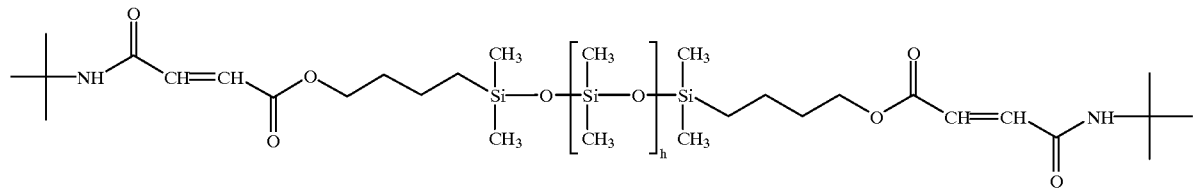
(IIc)

wherein:
d, f, g, h and k range from 0 to 250, preferably from 2 to 100; and
M' is hydrogen or fluorine.

A further suitable class of silicone-containing monomers includes monomers of the Formulae (IIIa) and (IIIb):

$$E'(*D*A*D*G)_a*D*A*D*E'; \text{ or} \quad (IIIa)$$

$$E'(*D*G*D*A)_a*D*G*D*E'; \quad (IIIb)$$

wherein:

D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of the formula:

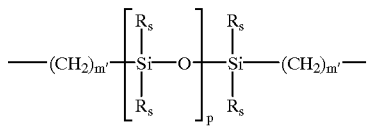

wherein:
each $R^s$ independently denotes an alkyl or fluoro-substituted alkyl group having 1 to 10 carbon atoms which may contain ether linkages between carbon atoms;
m' is at least 1 and
p is a number which provides a moiety weight of 400 to 10,000;
each E' independently denotes a polymerizable unsaturated organic radical represented by the formula:

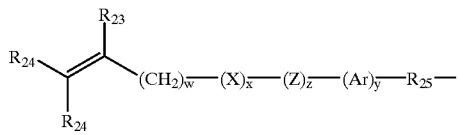

wherein:
$R_{23}$ is hydrogen or methyl;
$R_{24}$ is hydrogen, an alkyl radical having 1 to 6 carbon atoms, or a $-CO-Y-R_{26}$ radical wherein Y is $-O-$, $-S-$ or $-NH-$;
$R_{25}$ is a divalent alkylene radical having 1 to 10 carbon atoms; $R_{26}$ is a alkyl radical having 1 to 12 carbon atoms; X denotes $-CO-$ or $-OCO-$; Z denotes $-O-$ or $-NH-$; Ar denotes an aromatic radical having 6 to 30 carbon atoms; w is 0 to 6; x is 0 or 1; y is 0 or 1; and z is 0 or 1.

A specific urethane monomer is represented by the following:

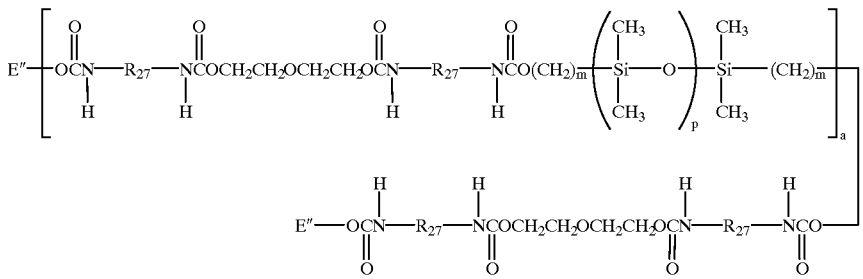
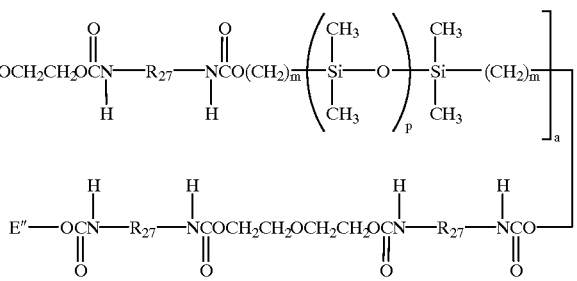

wherein m is at least 1 and is preferably 3 or 4, a is at least 1 and preferably is 1, p is a number which provides a moiety weight of 400 to 10,000 and is preferably at least 30, $R_{27}$ is a diradical of a diisocyanate after removal of the isocyanate group, such as the diradical of isophorone diisocyanate, and each E" is a group represented by:

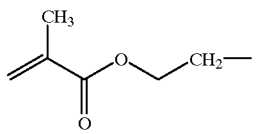

Other silicone-containing monomers include the silicone-containing monomers described in U.S. Pat. Nos. 5,034,461, 5,610,252 and 5,496,871, the disclosures of which are incorporated herein by reference. Other silicone-containing monomers are well-known in the art.

In the case of hydrogels, either the silicone-containing monomer or the hydrophilic monomer may function as a crosslinking agent (a crosslinker being defined as a monomer having multiple polymerizable functionalities) or a separate crosslinker may be employed.

The monomer mixtures include a UV-absorbing agent, defined as an agent that, when incorporated in the final lens, is capable of reducing at least 70% percent of light in the region of 200 to 400 nm, more preferably at least 70% of light in the region of 320 to 400 nm and at least 90% of light in the region of 290 to 320 nm. The invention is suitable for monomer mixtures including any conventional UV absorbing agent. One general class of such agents are non-polymerizable absorbers such as 2,2-drihydoxy-4,4-dimethoxy-benzophenone, and 2,2-dihydoxy-4-methoxy-benzophenone. Preferred, however, are polymerizable UV absorbing agents that include an activated unsaturated group that is reactive with the lens-forming monomers, whereby the UV absorbing agent is copolymerized with the lens-forming monomers. Representative polymerizable UV absorbing materials for such lens applications are described in U.S. Pat. No. 4,304,895 (Loshaek), U.S. Pat. No. 4,528,311 (Beard et al.), U.S. Pat. No. 4,716,234 (Dunks et al.), U.S. Pat. No. 4,719,248 (Bambury et al.), U.S. Pat. No. 3,159,646 (Milionis et al.) and U.S. Pat. No. 3,761,272 (Manneus et al.), the disclosures of which are incorporated herein by reference Specific examples include: benzotriazole-containing monomers such as 2-(2'-hydroxy- 5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole; and the polymerizable benzophenones described in U.S. Pat. No. 4,304,895.

The monomer mixtures may also include a tinting agent, defined as an agent that, when incorporated in the final lens, imparts some degree of color to the lens. The invention is applicable to conventional tinting agents known in the art, including non-polymerizable agents, or polyrnerizable agents that include an activated unsaturated group that is reactive with the lens-forming monomers. One preferred example of this latter class is the compound 1,4-bis(4-(2-methacryloxyethyl)phenylamino)anthraquinone, a blue visibility-tinting agent disclosed in U.S. Pat. No. 4,997,897.

As mentioned, photopolymerization of monomer mixtures to form lenses by UV curing has proved very effective, however, for lenses including a UV absorbing agent, ineffective or uneven curing is encountered since this agent absorbs UV light. The invention provides a method whereby lenses including both a UV absorbing agent and a tinting agent can be effectively photopolymerized by free radical polymerization.

More specifically, it was found that use of an initiator that includes a phosphine oxide moiety permitted satisfactory curing of monomer mixtures by photopolymerization to form lenses. Accordingly, it is preferred that the initial monomer mixtures include a phosphine oxide-containing initiator. The phosphine oxide moiety may be represented by the formula:

Preferred initiators include the following phosphine oxide-containing radical:

where n is zero or one, and preferably one.

Representative compounds with this phosphine oxide-containing moiety are of the formula:

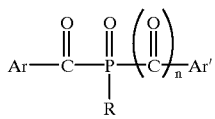

wherein Ar and Ar' are independently an optionally substituted aromatic radical, and R is an alkyl or optionally substituted aromatic radical, and n is zero or one and preferably one. Specific examples of such phosphine oxide-containing compounds include: bis(2,4,6-trimethylbenzoyl) phenylphosphine oxide (TMBPPO); bis(2,6-dimethoxybenzoyl)-2,4,4-trimethylpentylphosphine oxide (DMBAPO); 2,4,6-trimethylbenzyldiphenyl phosphine oxide; and 2,4,6-trimethylbenzyoyl diphenylphosphine oxide (MAPO). Commercially available initiator systems with these compounds include: Irgacure-819™ initiator, based on TMBPPO (Ciba Specialty Chemicals); Irgacure-1700™ initiator, including DMBAPO at about 25 wt % (Ciba Specialty Chemicals); Irgacure-1800™ initiator, including DMBAPO at about 25 wt % (Ciba Specialty Chemicals); MAPO (Ciba Specialty Chemicals); and Lucirin TPO™ initiator, based on 2,4,6-trimethylbenzyldiphenyl phosphine oxide (BASF).

Generally, the monomer mixtures is charged to a mold, and then subjected to light to effect curing of the monomer mixture in the mold. Various processes are known for curing a monomeric mixture in the production of contact lenses, including spincasting and static casting. Spincasting methods involve charging the monomer mixture to a mold, and spinning the mold in a controlled manner while exposing the monomer mixture to light. Static casting methods involve charging the monomer mixture between two mold sections, one mold section shaped to form the anterior lens surface and the other mold section shaped to form the posterior lens surface, and curing the monomer mixture by exposure to light. Such methods are described in U.S. Pat. Nos. 3,408,429, 3,660,545, 4,113,224, 4,197,266, and 5,271,875.

For the present invention, any light source may be used so long as it provides light in the visible region of the spectrum, and especially 400 to 500 nm. It is noted, however, that in some cases it may be desirable to filter out light in the ultraviolet region of the spectrum, especially light in the region of 300 to 400 nm; in some cases, exposure to light in this region may lead to undesired "warping" of the lens or "curling" at edges of the lens. Accordingly, although the light source does not need to provide light exclusively in the visible region of the spectrum, according to a distinct preferred embodiment the monomer mixture is exposed to light predominantly in the visible region of the spectrum. This may be accomplished either by selection of an appropriate light source relatively specific to visible light, or by using a light source providing a broad spectrum of light and filtering out UV radiation impinging on the monomer mixture.

The following examples illustrate various preferred embodiments. The following nomenclature is used in the description of experimental procedures:

$F_2D_{20}$—a polysiloxanediol-based fumarate prepolymer of Formula (IIc) endcapped with t-butylamine (derived from a polydimethylsiloxanediol, fumaryl chloride and t-butylamine according to U.S. Pat. No. 5,420,324) and described more fully in Synthesis C below.

ID2S4H—a polyurethane-based prepolymer endcapped with 2-methacryloxyethyl (derived from isophorone diisocyanate, diethylene glycol, a polydimethylsiloxanediol, and 2-hydroxyethyl methacrylate according to U.S. Pat. No. 5,034,561) and described more fully in Synthesis A below.

ID3S4H—a polyurethane-based prepolymer endcapped with 2-methacryloxyethyl (derived from isophorone diisocyanate, diethylene glycol, a polydimethylsiloxanediol, and 2-hydroxyethyl methacrylate according to U.S. Pat. No. 5,034,561) and described more fully in Synthesis B below.

TRIS—3-methacryloxypropyl tris(trimethylsiloxy)silane

DMA—N,N-dimethylacrylamide

IMVT—1,4-bis(4-(2-methacryloxyethyl)phenylamino) anthraquinone (Example 1i of U.S. Pat. No. 4,997,897), a blue visibility-tinting agent UV Agent—2-(2-hydroxy-5-methacrylamidophenyl)-5-methoxybenzotriazole (Example 4 of U.S. Pat. No. 4,719,248)

TXN—thioxoanthen-9-one

MDEA—N-methyldiethanolamine

Darocur-1173™—a commercial acetophenone-based initiator (Ciba Specialty Chemical), based on 2-hydroxy-2-methyl-phenylpropan-1-one Irgacure-184™—(I-184) a commercial acetophenone-based initiator (Ciba Specialty Chemical), based on 1-hydroxycyclohexyl phenyl ketone Irgacure-784™—(I-784) a commercial titanocene-based initiator (Ciba Specialty Chemical)

Irgacure-819™—(I-819) a commercial initiator based on bis(2,4,6-trimethylbenzoyl) phenylphosphine oxide (Ciba Specialty Chemical), Irgacure-1700™—(I-1700) a commercial initiator based on bis(2,6-dimethoxybenzoyl)-2,4,4-trimethylpentylphosphine oxide (about 25 wt %) and the Darocur-1173™ acetophenone-based initiator (Ciba Specialty Chemical)

Irgacure-1800™—(I-1800) a commercial initiator based on bis(2,6-dimethoxybenzoyl)-2,4,4-trimethylpentylphosphine oxide (about 25 wt %) and the Irgacure-184™ acetophenone-based initiator (Ciba Specialty Chemical).

Synthesis A

Preparation of a Polydimethylsiloxane-based Polyurethane Polymer—(ID2S4H)

A dry 3-neck, 1000 mL round bottom flask was connected to a nitrogen inlet tube and a reflux condenser linked. Then, isophorone (16.916 g, 0.0761 mole), diethylene glycol (4.038 g, 0.0380 mole), dibutyl tin dilaurate (0.383 g) and 140 mL of methylene chloride were added into the flask all at once and the contents were refluxed. After 16 hours, the amount of isocyanate was determined and decreased to 47.0% by titration. Then α, ω-bis(4-hydroxybutyl) polydimethylsiloxane (102.56 g, 0.02536 mole) was added into the flask. Refluxing was continued for 33 hours, and the amount of isocyanate was decreased to 14.1% of the original by titration. The contents were then cooled to ambient temperature. 2-Hydroxyethyl methacrylate (2.2928 g) and 1,1'-bi-2-phenol (0.0129 g) were then added and the contents were stirred at ambient until isocyanate peak at 2267 cm$^{-1}$ disappeared from IR spectrum of the product. The solvent was then stripped under reduced pressure to yield the product.

Synthesis B

Preparation of a Polydimethylsiloxane-based Polyurethane polymer—(ID3S4H)

The procedure in Example 1 was followed except that the molar ratios of ingredients was varied. Specially, the amounts of ingredients in the early synthesis step were: isophorone diisocyanate (10.425 g, 0.04799 mole) and diethylene glycol (2.5469 g, 0.024 mole); and in the subsequent synthesis step, α, ω-bis(4-hydroxybutyl) polydimethylsiloxane (74.22g, 0.01799 mole), and 2-hydroxyethyl methacrylate (1.8376 g).

Synthesis C

Preparation of a Polydimethylsiloxane-based Fumarate Prepolymer End-capped with t-butylamine ($F_2D_{20}$)

A 3-neck, 500 mL round bottom flask was connected to a nitrogen inlet tube and a reflux condenser was linked in series to a potassium hydroxide tube and a sodium hydroxide solution. Fumaryl chloride (12.56 g, 0.082 mole), α, ω-bis(4-hydroxybutyl) polydimethylsiloxane of Mn 1595 (59.81 g, 0.0375 mole) and 250 mL of anhydrous methylene chloride were added to the flask. The contents were refluxed under nitrogen purging. After 18 hours, it was found that the OH groups were gone by analyzing an aliquot by high resolution NMR. The unreacted fumaryl chloride and the solvent were stripped under vacuum. Next, 50 mL of methylene chloride was added and the mixture cooled to 0–5° C. Then, t-butylamine (11.67 g, 0.1595 mole) in 250mL of methylene chloride was added slowly to maintain a low temperature. The mixture was kept at room temperature while stirring overnight. The ammonium salt was filtered and the mixture washed with aqueous sodium bicarbonate two times and then with water until neutral. The product was dried with magnesium sulfate and the methylene chloride was stripped. This crude product (64.5 g) was then redissolved in 130 mL of methylene chloride and passed through a silica gel column. The first 195 mL was collected then the column was eluted with 65 mL of methylene chloride. The final combined 260 mL eluent was rotevaporated and vacuum dried at 80° C. to give to give 62.3 g product. The prepolymer was characterized by IR, NMR and size exclusion chromatography (SEC). IR (cm$^{-1}$):3325, 2962, 1727, 1644, 1541, 1456, 1412, 1365, 1297, 1257, 1222, 1159, 1010, 963 and 786; 200 Mhz H-NMR (ppm) 0.00, 0.56 (t), 1.39 (s,) 1.40 (m) 1.69 (m), 4.17 (t), 5.70 (broad), 6.77 (m); SEC (by polystyrene standard) gave Mn of 2593, Mw 3,887; polydispersity 1.50.

Preparation of Monomer Mixtures

A first series of monomer mixtures, suitable for providing silicone hydrogel contact lenses, were prepared by mixing the following components:

Mixture 1A—$F_2D_2$ (20 parts by weight (pbw)); TRIS (40 pbw), DMA (40 pbw); hexanol solvent (20 pbw); and Darocur-1173 initiator (0.5 pbw)

Mixture 1B—$F_2D_{20}$ (20 parts by weight (pbw)); TRIS (40 pbw), DMA (40 pbw); hexanol solvent (20 pbw); and UVAgent (0.5 pbw)

Mixture 1C—$F_2D_{20}$ (20 parts by weight (pbw)); TRIS (40 pbw), DMA (40 pbw); hexanol solvent (20 pbw); UVAgent (0.5 pbw); and IMVT (150 ppm)

A second series of monomer mixtures, suitable for providing silicone hydrogel contact lenses, were prepared by mixing the following components:

Mixture 2A—ID2S4H (50 parts by weight (pbw)); TRIS (20 pbw), DMA (30 pbw); hexanol solvent (20 pbw); and Darocur-1173 initiator (0.5 pbw)

Mixture 2B—ID2S4H (50 parts by weight (pbw)); TRIS (20 pbw), DMA (30 pbw); hexanol solvent (20 pbw); and UVAgent (0.5 pbw)

Mixture 2C—ID2S4H (50 parts by weight (pbw)); TRIS (20 pbw), DMA (30 pbw); hexanol solvent (20 pbw); UVAgent (0.5 pbw); and IMVT (150 ppm).

General Preparation of Hydrogel Films

Monomer mixtures were cured into films by placing the mixture between two silane-treated glass plates and exposing to a light source for 1 hour. Cured films were released from the plates and extracted with isopropanol, then heated in boiling water. Films were equilibrated in borate buffered saline before characterization.

COMPARATIVE EXAMPLES

To Mixtures 1B and 2B was added 0.5% of Darocur-1173 initiator. Then, these mixtures, along with Mixtures 1A and 2A, were cured under UV light (4000 µW) according to the procedure described above. Mixtures 1A and 2A, containing neither a UV absorbing agent nor a tinting agent, were fully cured. However, for Mixtures 1B and 2B, containing a UV absorbing agent but no tinting agent, the mixtures became very viscous but were not cured.

COMPARATIVE EXAMPLES

To Mixtures 1B, 1C, 2B and 2C were added 0.2 wt % TXN and 0.4 wt % MDEA. Then, these mixtures were cured under visible light (about 16 mW) in a nitrogen atmosphere according to the procedure described above. Mixtures 1B and 2B, containing a UV absorbing agent but no tinting agent, were cured, although the films were curly. These results are consistent with the experiments reported in U.S. Pat. No. 4,719,248. However, for Mixtures 1C and 2C, containing both the UV absorbing agent and the tinting agent, the mixtures became very viscous but were not cured.

COMPARATIVE EXAMPLES

To Mixtures 1B, 1C, 2B and 2C were added 0.2 wt % camphor quinone and 0.4 wt % MDEA. Then, these mixtures were cured under visible light (about 16 mW) in a nitrogen atmosphere according to the procedure described above. Mixtures 1B and 2B, containing a UV absorbing agent but no tinting agent, were cured, although the films were curly. However, for Mixtures 1C and 2C, containing both the UV absorbing agent and the tinting agent, the mixtures stayed fluid.

COMPARATIVE EXAMPLES

To Mixtures 1C and 2C (containing both a UV-absorbing agent and a tinting agent) was added Irgacure-784 initiator at amounts of 0.25, 0.5, 0.75 and 1.0 wt %. Then, these mixtures were exposed to visible light in a nitrogen atmosphere according to the procedure described above. The mixtures stayed fluid.

EXAMPLES 1 and 2

Irgacure-1700 initiator was added to Mixtures 1C and 2C (containing both a UV-absorbing agent and a tinting agent) at amounts of 1.0, 2.0, 3.0 and 4.0 weight percent. Additionally, Irgacure-1800 initiator was added to Mixtures 1C and 2C at amounts of 1.0, 2.0, 3.0 and 4.0 weight percent. Both of these initiator systems include about 25 weight percent of bis(2,6-dimethoxybenzoyl)-2,4,4-trimethylpentylphosphine oxide. Then, this series of mixtures was cured under visible light in a nitrogen atmosphere according to the procedure described above. Hydration and equilibration in borate buffered saline yielded hydrogel films. The hydrogel films showed some curliness at edges of the films.

EXAMPLES 3 and 4

Irgacure-819 initiator was added to Mixtures 1C and 2C (containing both a UV-absorbing agent and a tinting agent) at amounts of 0.25, 0.5, 0.75 and 1.0 weight percent. This initiator system is based on bis(2,4,6-trimethylbenzoyl)phenylphosphine oxide. Then, this series of mixtures was cured under visible light in a nitrogen atmosphere according to the procedure described above. The monomer mixtures were fully cured to form films. The films were initially somewhat yellow in appearance, but upon hydration and equilibration in borate buffered saline, the hydrogel films appeared green. The hydrogel films showed some curliness at edges of the films.

EXAMPLES 5 and 6

Irgacure-819 initiator was added to Mixtures 1C and 2C (containing both a UV-absorbing agent and a tinting agent) at 0.75 weight percent. This initiator system is based on bis(2,4,6-trimethylbenzoyl)phenylphosphine oxide. Then, this series of mixtures was cured under visible light as in Examples 3 and 4, except that a glass plate coated with a UV-absorbing agent was placed between the light source and the monomer mixture to be cured, such that this coated plate was able to filter substantially all light below 400 nm. The monomer mixes were fully cured to form films. Upon hydration and equilibration in borate buffered saline, the hydrogel films exhibited no curliness.

EXAMPLE 7

A series of monomer mixtures prepared as in Examples 5 and 6 was used to cast contact lenses. The monomer mixtures were placed on the molding surface of a first plastic mold section, shaped to provide an anterior contact lens surface, and a second plastic mold section having a molding surface shaped to provide a posterior contact lens surface was placed on the first mold section, the monomer mixture being contained in the mold cavity formed between these two molding surfaces. This assembly was then subjected to visible light source for 1 hour. The two mold sections were separated, the lenses were released from the mold section in isopropanol, then heated in boiling water. The lenses were equilibrated in borate buffered saline before characterization, resulting in hydrogel contact lenses having good optical quality.

EXAMPLE 8

Hydrogel films from Example 1 (based on Mixture 1C with 1.0 weight percent Irgacure-1700 initiator, and based on Mixture 1C with 1.0 weight percent Irgacure-1800 initiator), the films having a thickness of 180 microns, were subject to UV-VIS absorption measurements. Both sets of films had analogous light transmittance.

| Wavelength (nm) | Transmittance (% T) |
|---|---|
| 400–800 | 92 |
| 200–400 | 2.7 |
| 320–400 (UVA) | 6.5 |
| 320–290 (UVB) | 0.4 |
| 290–200 (UVC) | 0.2 |

EXAMPLES 9–18

Various initiators were added to Monomer Mixture 1C, and hydrogel films were cured under a visible light source and processed according to the general procedure described above. Mechanical testing of the hydrogel films was conducted in buffered saline on an Instron instrument, according to modified ASTM D-1708 test procedure (tensile modulus) and ASTM D-1938 test procedure (tear strength). Extractibles of cured films and water content of the hydrogel films were determined gravimetrically. The results are reported in the following Table.

| Example | Initiator and Amount (wt %) | Modulus (g/mm$^2$) | Tear Strength (g/mm) | % Extractibles | % Water |
|---|---|---|---|---|---|
| 9 | I-1800 (1%) | 39 | 18 | 14.2 | 38.4 |
| 10 | I-1800 (2%) | 48 | 12 | 11.2 | 40.4 |
| 11 | I-1800 (3%) | 41 | 11 | 9.0 | 36.8 |
| 12 | I-1800 (4%) | 47 | 10 | 14.2 | 37.9 |
| 13 | I-1700 (1%) | 40 | 16 | 12.6 | 12.6 |
| 14 | 1-819 (0.25%) | 48 | 13 | 6.3 | 37.6 |
| 15 | I-819 (0.5%) | 49 | 13 | 7.9 | 37.6 |
| 16 | I-819 (0.75%) | — | 10 | 9.1 | 36.3 |
| 17 | I-819 (0.75%)* | 36 | 13 | — | — |
| 18 | I-819 (1%) | 48 | 10 | 8.2 | 35.2 |

*Cured under light source with UV filter (as in Examples 5 and 6 procedure)

Photo Differential Scanning Calorimetry (Photo DSC)

Additionally, the curing of various monomer mixtures of Examples 9–18 was evaluated using photo differential scanning calorimetry. In a Dupont differential scanning calorimetry unit, the monomer mixture is placed in a sample pan at ambient temperature and polymerized under nitrogen atmosphere by exposure to the light source. The exothermic profile was monitored, and the following table reports peak time (time of highest recorded exotherm) and maximum heat flow (at peak time). For comparative purposes, 0.5 wt % camphor quinone and 0.5 wt % MDEA were added to Mixture 1C (designated CM-1 in the table). The Photo DSC evaluation yielded no recordable peak time, as shown in the table.

| Example | Initiator and Amount (wt %) | Peak Time (min) | Heat Flow (MW) |
|---|---|---|---|
| CM-1 | CQ/MDEA (0.5%/0.5%) | None | — |
| 9 | I-1800 (1%) | 20.6 | 9 |
| 10 | I-1800 (2%) | 15.3 | 13 |
| 11 | I-1800 (3%) | 12.2 | 14 |
| 12 | I-1800 (4%) | 11.5 | 14 |
| 13 | I-1700 (1%) | 21.5 | 9 |
| 14 | 1-819 (0.25%) | 17.7 | 10 |
| 15 | I-819 (0.5%) | 12.8 | 13 |
| 16 | I-819 (0.75%) | 11.6 | 14 |
| 17 | I-819 (0.75%)* | 14.2 | 12 |
| 18 | I-819 (1%) | 10.2 | 17 |

*Cured under light source with UV filter

EXAMPLES 19–27

As in Examples 9–18, various initiators were added to Monomer Mixture 2C, and hydrogel films were cured under a visible light source, processed, and tested for mechanical properties. Photo DSC evaluation was also undertaken. The results are reported in the following tables.

| Example | Initiator and Amount (wt %) | Modulus (g/mm$^2$) | Tear Strength (g/mm) | % Extractibles | % Water |
|---|---|---|---|---|---|
| 19 | I-1800 (1%) | 75 | 6 | 9.3 | 27.6 |
| 20 | I-1800 (2%) | 76 | 6 | 10.2 | 29.3 |
| 21 | I-1800 (3%) | 74 | 6 | 11.3 | 28.1 |
| 22 | I-1800 (4%) | 72 | 6 | 14.5 | 29.6 |
| 23 | 1-819 (0.25%) | 79 | 7 | 0.9 | 28.2 |
| 24 | I-819 (0.5%) | 76 | 7 | 3.0 | 28.3 |
| 25 | I-819 (0.75%) | 71 | 7 | 4.4 | 28.4 |
| 26 | I-819 (0.75%)* | 75 | 7 | — | — |
| 27 | I-819 (1%) | 76 | 7 | 5.3 | 28.2 |

*Cured under light source with UV filter

| Example | Initiator and Amount (wt %) | Peak Time (min) | Heat Flow (MW) |
|---|---|---|---|
| 19 | I-1800 (1%) | 3.8 | 17 |
| 20 | I-1800 (2%) | 26 | 23 |
| 21 | I-1800 (3%) | 22 | 25 |
| 22 | I-1800 (4%) | 24 | 29 |
| 23 | 1-819 (0.25%) | 33 | 25 |
| 24 | I-819 (0.5%) | 3.0 | 28 |
| 25 | I-819 (0.75%) | 2.0 | 37 |
| 26 | I-819 (0.75%)* | 2.6 | 28 |
| 27 | I-819 (1%) | 2.0 | 38 |

*Cured under light source with UV filter

EXAMPLES 28–31

Preparation of Additional Monomer Mixtures

Monomer mixtures, suitable for providing silicone hydrogel contact lenses, were prepared by mixing ID3S4H, TRIS and DMA. Additionally, IMVT was added at 150 ppm, UV Agent was added at 0.5 pbw, and Irgacure-819 initiator was added at 0.5 pbw. These mixtures are designated Monomer Mixture 3A hereafter.

Monomer mixtures, suitable for providing hydrogel contact lenses, were prepared from 2-hydroxyethylmethacrylate, N-vinylpyrrolidone, crosslinking monomers and 4-t-butyl-2-hydroxycyclohexylmethacrylate. Additionally, IMVT was added at 150 ppm, UV Agent was added at 0.5 pbw, and Irgacure-819 initiator was added at 0.5 pbw. These mixtures are designated Monomer Mixture 4A hereafter.

The mixtures were exposed to three different light sources, for curing into films, using the general procedures described above: (1) a UV lamp (4000 $\mu$W) providing light mainly below 400 nm; (2) a visible light source; and (3) the same visible light source with a UV filter using a set-up as in Examples 5 and 6. The attempt to cure Mixtures 3A and 4A under the 1) UV lamp resulted in very curly films indicating uneven curing. Mixtures 3A and 4A were effectively cured using both the (2) visible light source and (3) the visible light source with a UV filter; mechanical properties of these films, measured as in Example 9, are listed in the following tables.

| Ex. | Mix. | Light Source | Film Appearance | Tear Strength (g/mm) | Modulus (g/mm$^2$) | % Extr. | % Water |
|---|---|---|---|---|---|---|---|
| 28 | 3A | Visible | slightly curly | 9 | 46 | 13.6 | 24.7 |
| 29 | 3A | Vis + UV Filter | flat | 10 | 47 | 13.1 | 25.0 |
| 30 | 4A | Visible | slightly curly | 2 | 19 | 9.8 | 69.5 |

| Ex. | Mix. | Light Source | Film Appearance | Tear Strength (g/mm) | Modulus (g/mm²) | % Extr. | % Water |
|---|---|---|---|---|---|---|---|
| 31 | 4A | Vis + UV Filter | flat | 2 | 21 | 9.2 | 68.3 |

EXAMPLE 32

Mixture 4A was used to cast contact lenses. The monomer mixture was placed on the molding surface of a first plastic mold section, shaped to provide an anterior contact lens surface, and a second plastic mold section having a molding surface shaped to provide a posterior contact lens surface was placed on the first mold section, the monomer mixture being contained in the mold cavity formed between these two molding surfaces. This assembly was then subjected to a visible light source with UV radiation being filtered out. In one set of tests, the two mold sections were then immediately separated, lenses were released from the mold section, and ultimately equilibrated in borate buffered saline. In a second set of tests, the lenses were subjected to a thermal post-cure before separation from the mold sections and hydration. Both test runs resulting in hydrogel contact lenses having good optical quality, with a water content of 61.0% and 61.3%, respectively, a modulus of 42 and 36 g/mm², respectively, and a tear strength of 2 g/mm for both tests.

Many other modifications and variations of the present invention are possible to the skilled practitioner in the field in light of the teachings herein. It is therefore understood that, within the scope of the claims, the present invention can be practiced other than as specifically described.

I claim:

1. A method for polymerizing a monomer mixture to form a lens comprising:

charging to a mold a monomer mixture including lens-forming monomers, a UV-absorbing compound, a tinting agent and a polymerization initiator including a phosphine oxide moiety; and exposing the monomer mixture in the mold to a light source including light in the visible region of the spectrum to polymerize the monomer mixture and form the lens, wherein UV light is filtered from the light source impinging on the monomer mixture.

2. The method of claim 1, wherein the initiator includes a compound of the general formula:

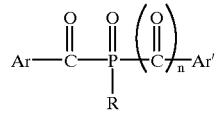

wherein Ar and Ar' are independently an optionally substituted aromatic radical, R is an optionally substituted alkyl or aromatic radical, and n is zero or one.

3. The method of claim 2, wherein n is one.

4. The method of claim 2, wherein the initiator includes a compound selected from the group consisting of: bis(2,6-dimethoxybenzoyl)-2,4,4-trimethylpentylphosphine oxide; and bis(2,4,6-trimethylbenzoyl)phenylphosphine oxide.

5. The method of claim 1, wherein the lens is a contact lens.

6. The method of claim 5, wherein the monomer mixture is polymerized in a mold cavity formed between a first mold section having a molding surface shaped to provide a posterior contact lens surface and a second mold section having a molding surface shaped to provide an anterior contact lens surface.

7. The method of claim 5, wherein the lens is a hydrogel contact lens.

8. The method of claim 7, wherein the lens is a silicone hydrogel contact lens.

* * * * *

UNITED STATES PATENT AND TRADEMARK OFFICE
CERTIFICATE OF CORRECTION

PATENT NO. : 6,359,024 B2
DATED : March 19, 2002
INVENTOR(S) : Yu-Chin Lai

It is certified that error appears in the above-identified patent and that said Letters Patent is hereby corrected as shown below:

Column 16,
Line 32, replace "posterior" wth -- anterior --.
Line 33, replace "anterior" with -- posterior --.

Signed and Sealed this

Twenty-sixth Day of October, 2004

JON W. DUDAS
*Director of the United States Patent and Trademark Office*